United States Patent
Chien et al.

(10) Patent No.: US 10,862,590 B1
(45) Date of Patent: Dec. 8, 2020

(54) MIXED SIGNAL PRE-EMPHASIS TECHNIQUE FOR OPTICAL TRANSCEIVERS

(71) Applicant: ZTE Corporation, Shenzhen (CN)

(72) Inventors: Hung-Chang Chien, Bridgewater, NJ (US); Yi Cai, Jackson, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/735,585

(22) Filed: Jan. 6, 2020

(51) Int. Cl.
  *H04B 10/04* (2006.01)
  *H04B 10/58* (2013.01)
  *H04B 10/079* (2013.01)
  *H04B 10/40* (2013.01)
  *H04Q 11/00* (2006.01)

(52) U.S. Cl.
  CPC ....... *H04B 10/58* (2013.01); *H04B 10/07953* (2013.01); *H04B 10/40* (2013.01); *H04Q 11/0071* (2013.01)

(58) Field of Classification Search
  CPC .... H04B 10/564; H04B 10/58; H04B 10/504; H04B 10/2507; H04B 10/40; H04B 10/541; H04B 10/5057; H04B 10/25137
  USPC ....... 398/183, 192, 193, 194, 195, 196, 197, 398/198, 199, 200, 201, 135, 136, 158, 398/159, 33, 38, 26, 27
  See application file for complete search history.

(56) References Cited

U.S. PATENT DOCUMENTS

| | | | |
|---|---|---|---|
| 8,483,577 B2* | 7/2013 | Mazzini | H04B 10/58 398/193 |
| 8,718,488 B2* | 5/2014 | Sugawara | H04B 10/504 398/193 |
| 2008/0107423 A1* | 5/2008 | Lee | H04B 10/40 398/136 |

OTHER PUBLICATIONS

Matsushita, A. et al, 64-GBd PDM-256QAM and 92-GBd PDM-64QAM Signal Generation using Precise-Digital-Calibration aided by Optical-Equalization, 2019 Optical Fiber Communications Conference and Exhibition (OFC), Optical Society of America.
Schuh, K. et al., Single Carrier 1.2 Tbit/s Transmission over 300 km with PM-64 QAM at 100 GBaud, 2017 Optical Fiber Communications Conference and Exhibition (OFC), Optical Society of America.

* cited by examiner

*Primary Examiner* — Hanh Phan
(74) *Attorney, Agent, or Firm* — Perkins Coie LLP (57) ABSTRACT

An optical signal transmitter system in an optical communication network includes a digital pre-emphasis device structured to generate a pre-emphasized digital data signal by pre-emphasizing at least a portion of a digital data signal to be transmitted, a digital-to-analog converter coupled to the digital pre-emphasis device to convert the pre-emphasized digital data signal into an analog data signal, an analog pre-emphasis device coupled to the digital-to-analog converter to generate a pre-emphasized analog data signal by pre-emphasizing at least a portion of the analog data signal, an electrical-to-optical converter to convert the pre-emphasized analog signal into an optical signal, and a processor (Continued)

configured to determine a pre-emphasis assignment distribution between the digital pre-emphasis device and the analog pre-emphasis device.

21 Claims, 8 Drawing Sheets

MIXED SIGNAL PRE-EMPHASIS TECHNIQUE FOR OPTICAL TRANSCEIVERS

TECHNICAL FIELD

This document relates to optical communication systems.

BACKGROUND

With the increasing demand for more efficient ways to transmit optical signals, some optical networks use multi-level pulse amplitude modulation (m-PAM) and multi-level quadrature amplitude modulation (m-QAM). Optical transmitters that employ such high-order modulation schemes are more sensitive to high-frequency loss when bandwidth becomes insufficient, which leads to a degradation of the quality of the optical signal.

SUMMARY

The present document discloses, among other things, techniques for improving the system performance of optical transmitters by using a mixed signal pre-emphasis technique.

In an example aspect, an optical signal transmitter system in an optical communication network is disclosed. The system includes a digital pre-emphasis device structured to generate a pre-emphasized digital data signal by pre-emphasizing at least a portion of a digital data signal to be transmitted, a digital-to-analog converter coupled to the digital pre-emphasis device to convert the pre-emphasized digital data signal into an analog data signal, an analog pre-emphasis device coupled to the digital-to-analog converter to generate a pre-emphasized analog data signal by pre-emphasizing at least a portion of the analog data signal, an electrical-to-optical converter to convert the pre-emphasized analog signal into an optical signal, and a processor configured to determine a pre-emphasis assignment distribution between the digital pre-emphasis device and the analog pre-emphasis device based on transfer functions of the digital pre-emphasis device, the analog pre-emphasis device, the digital-to-analog converter and electrical-to-optical converter, and an estimate of an inverse radio frequency response of the optical signal transmitter system obtained at an output terminal of the electrical-to-optical converter.

In another example aspect, a method of optical communication, implementable at an optical signal transmitter in an optical communication network is disclosed. The method includes estimating, during a calibration phase, a channel response of the optical signal transmitter to generate an initial estimate of the channel response based on at least one of transfer functions of a digital-to-analog converter component, a driver amplifier component, or an electrical-to-optical conversion component of the optical signal transmitter, pre-emphasizing at least a portion of a digital data signal by using a digital pre-emphasis component to generate a first pre-emphasized digital data signal, converting the first pre-emphasized digital data signal into a first analog data signal by using the digital-to-analog converter component, pre-emphasizing at least a portion of the first analog data signal by using an analog pre-emphasis component to generate a first pre-emphasized analog data signal, converting the first pre-emphasized analog signal into an optical signal using the electrical-to-optical conversion component to generate a first channel response, and determining a first pre-emphasis assignment distribution between the digital pre-emphasis component and the analog pre-emphasis component such that the first channel response meets predetermined criteria including at least one of signal to noise ratio (SNR), error vector magnitude (EVM), or bit error rate (BER).

In another example aspect, an optical signal transmitter system in an optical communication network is disclosed. The system includes a digital pre-emphasis device structured to generate a pre-emphasized digital data signal by pre-emphasizing at least a portion of a data bit signal to be transmitted, a digital-to-analog converter coupled to the digital pre-emphasis device to convert the pre-emphasized digital data signal into an analog data signal, an analog pre-emphasis device coupled to the digital-to-analog converter to generate a pre-emphasized analog data signal by pre-emphasizing at least a portion of the analog data signal, and an electrical-to-optical converter to generate a channel response by converting the pre-emphasized analog signal into an optical signal.

In another example aspect, a method of optical communication, implementable at an optical signal transmitter in an optical communication network, is disclosed. The method includes estimating a channel response of the optical signal transmitter based on at least one of a transfer functions of a digital-to-analog converter component, a driver amplifier component, or an electrical-to-optical conversion component of the optical signal transmitter, pre-emphasizing at least a portion of each data bit signal by using a digital pre-emphasis component to generate a first pre-emphasized digital data signal, converting the first pre-emphasized digital data signal into a first analog data signal by using the digital-to-analog converter component, pre-emphasizing at least a portion of the first analog data signal by using an analog pre-emphasis component to generate a first pre-emphasized analog data signal, converting the first pre-emphasized analog signal into an optical signal using the electrical-to-optical conversion component to generate a first channel response, and transmitting, upon determination that the first channel response meets predetermined criteria, the first channel response.

These and other aspects, and their implementations and variations are set forth in the drawings, the description and the claims.

DETAILED DESCRIPTION

In optical communication systems, transmitter and receiver devices are used to transmit data, including user data and control data, by modulating optical signals such as light waves over an optical communication channel such as an optical fiber. Typical transmitter or receiver side implementations include an electrical portion in which data is processed using electronic circuitry and optical portion in which optical signal processing is performed. In the electrical portion, data processing may include digital and/or analog signal processing.

In general, optical signal processing or analog electrical signal processing tends to be more expensive and/or bulky and not amenable to precise or numerical control of signal and component values. Traditionally, non-linearities and other imprecisions in components, which lead to signal distortion and data transmission errors, are corrected using expensive and imprecise optical or analog electrical domain signal processing techniques.

The techniques disclosed in the present document may be used for addressing such technical limitations and more.

Figure 1:
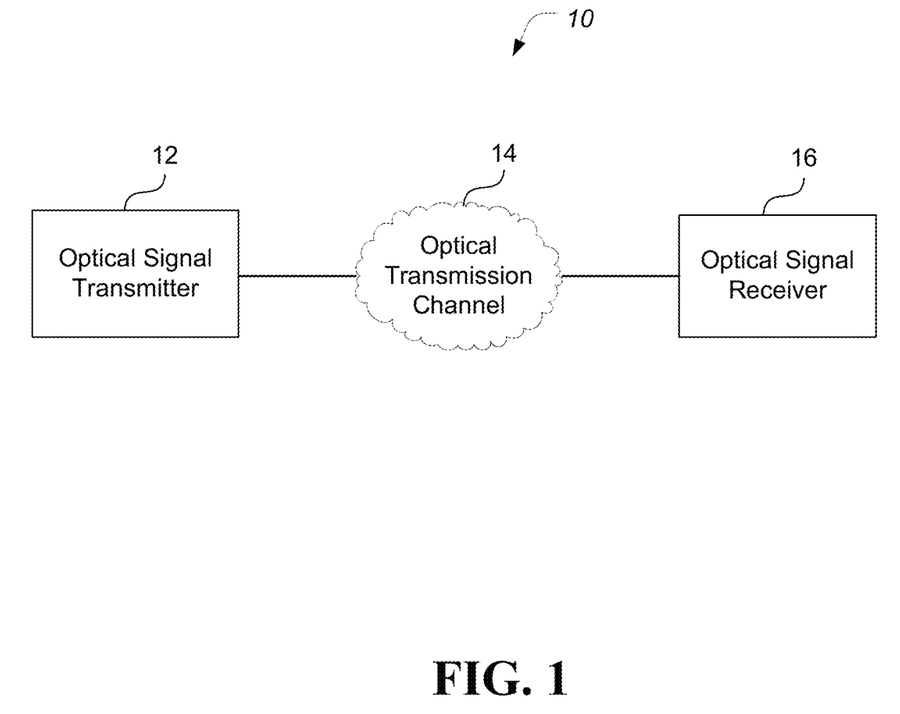
FIG. 1 illustrates an example optical communication network.

FIG. 1 illustrates an example optical communication network 10 in which an optical signal transmitter 12 and an optical signal receiver 16 communicate with each other via an optical transmission channel 14. The optical signal transmitter 12 may include circuitry configured to convert data to electrical input signals and convert the electrical signals to optical signals. The optical transmission channel 14 may include optical fibers that extend in length from several hundred feet to several thousands of kilometers. The optical signals that have passed the optical transmission channel 14 may be transmitted through intermediate optical equipment such as amplifiers, repeaters, switches, etc., which are not shown in FIG. 1 for clarity. The optical signal receiver 16 may include circuitry configured to perform the actual reception of the optical signals and convert the optical signals into electrical signals.

In an implementation, the optical signal transmitter 12 may generate multi-level modulation optical signals such as m-PAM and m-QAM optical signals based on electrical data signals generated using a pre-emphasis technique. The optical signal receiver 16 may include digital signal processing (DSP) circuitry to restore the electrical input signal.

For high-speed optical communications using higher level modulations such as mQAM or mPAM, digital-to-analog converters (DACs) are typical required at the transmitters. DAC can flexibly generate complex modulation formats and can also easily perform digital pre-emphasis to compensate for the high-frequency loss at the transmitter, the receiver or both.

Figure 2:
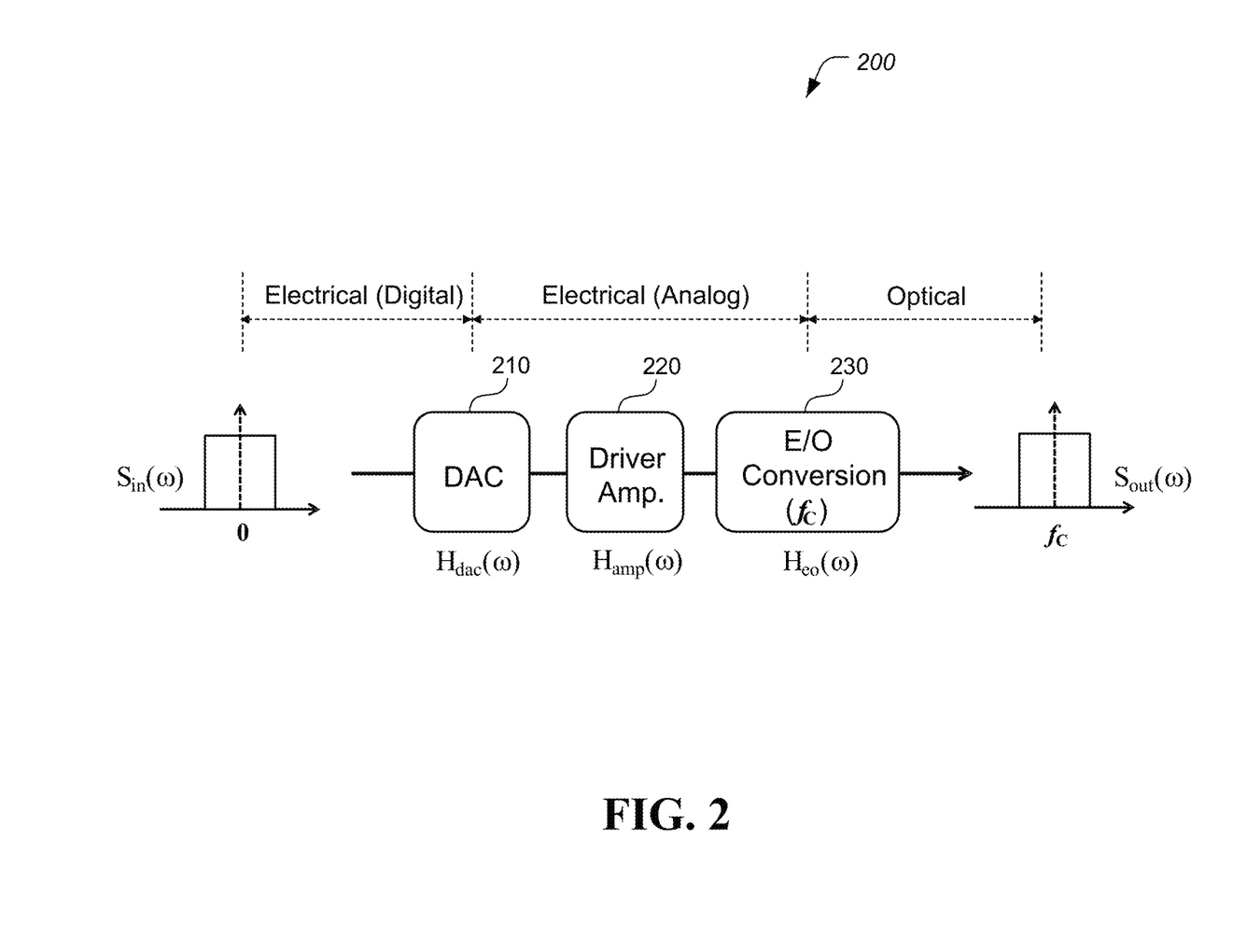
FIG. 2 illustrates an example configuration of an optical transmitter.

FIG. 2 illustrates an example optical signal transmitter 200 including a DAC 210, a driver amplifier 220, and an electrical-to-optical (E/O) conversion module 230. Here the E/O conversion module 230 may include an optical modulator with an external laser source having a carrier frequency of $f_C$. Since the DAC 210, the driver amplifier 220, and the E/O conversion module 230 having frequency responses of $H_{dac}(\omega)$, $H_{amp}(\omega)$ and $H_{eo}(\omega)$, respectively, are all bandlimited, an output optical signal $S_{out}(\omega)$ may suffer from high frequency loss compared to an input digital $S_{in}(\omega)$.

Although digital pre-emphasis can generate an inverse frequency response to counteract the actual frequency response of transmitter and receivers, the higher peak-average-to-power-ratio (PAPR) nature of the pre-emphasized digital signal will lead to higher quantization noise, and lower power level at the DAC output.

The disclosed technology can be implemented in some embodiments to alleviate the unwanted quantization noise in the digital pre-emphasis by implementing the pre-emphasis in the optical domain or by performing a joint digital and optical pre-emphasis. In this way, it is possible to offload all or part of the pre-emphasis function to optical domain to minimize the PAPR before the DAC with lower quantization noise after the DAC.

Figure 3:
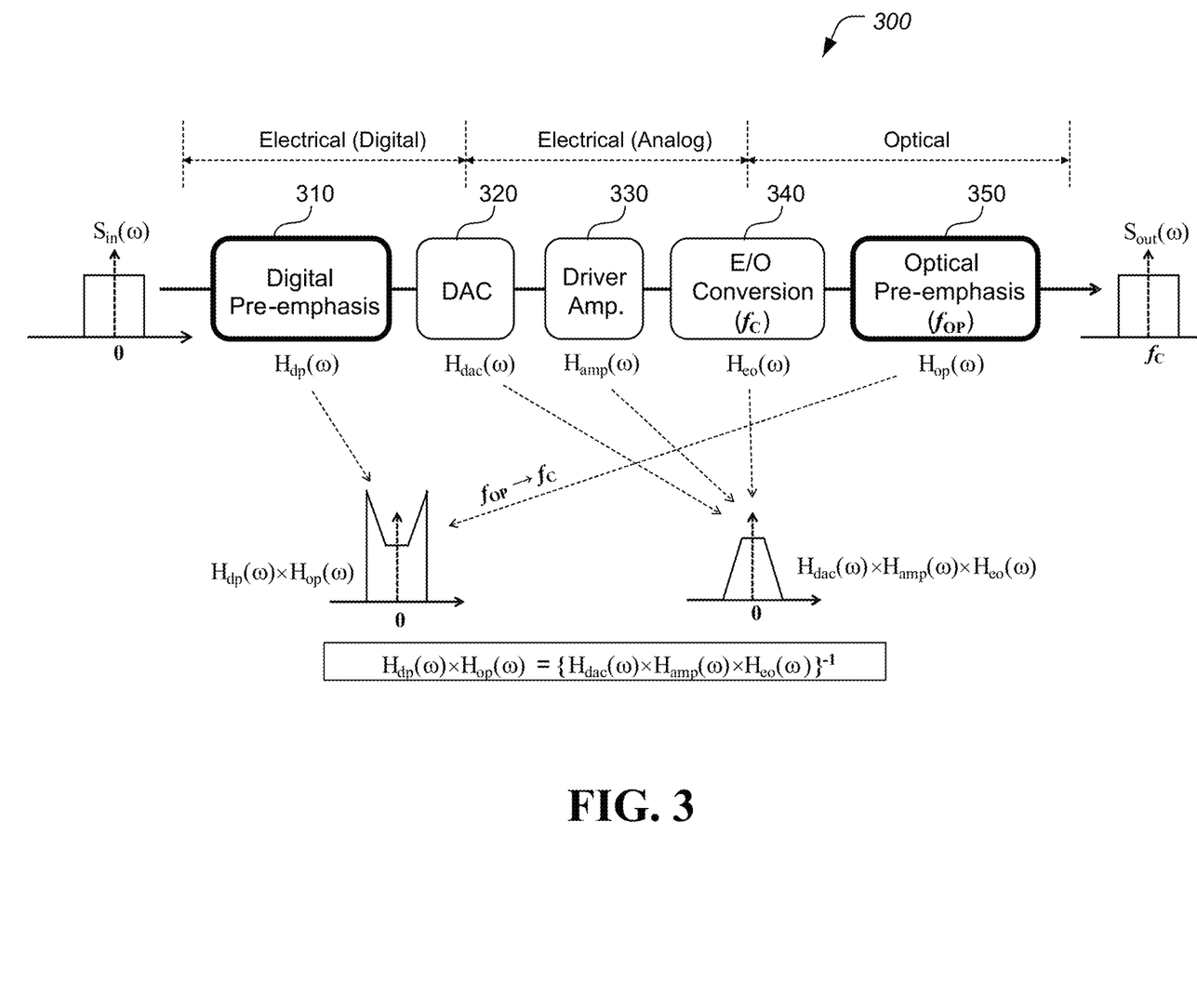
FIG. 3 illustrates an example optical signal transmitter implemented based on some embodiments of the disclosed technology.

FIG. 3 illustrates an example optical signal transmitter implemented based on some embodiments of the disclosed technology, which shows the joint digital and optical pre-emphasis approach. In some implementations, an optical signal transmitter 300 includes a digital pre-emphasis module 310, a DAC 320, a driver amplifier 330, an E/O conversion module 340, and an optical pre-emphasis module 350.

The disclosed technology can be implemented in some embodiments to optimize the output signal $S_{out}(\omega)$ by finding the best available $H_{dp}(\omega) \times H_{op}(\omega)$ that equals to the inverse channel response $\{H_{dac}(\omega) \times H_{amp}(\omega) \times H_{eo}(\omega)\}^{-1}$, where $H_{dp}(\omega)$ indicates a transfer function of the digital pre-emphasis module 310, $H_{op}(\omega)$ indicates a transfer function of the optical pre-emphasis module 350, $H_{dac}(\omega)$ indicates a transfer function of the DAC 320, $H_{amp}(\omega)$ indicates a transfer function of the driver amplifier 330, and $H_{eo}(\omega)$ indicates a transfer function of the E/O conversion module 340. FIG. 3 illustrates the spectrum shape of the output optical signal $S_{out}(\omega)$ as identical to the spectrum shape of the input signal $S_{in}(\omega)$ for illustrative purposes only and to explain the high-frequency compensation. In fact, the goal of the pre-emphasis is to achieve the best performance at the system output in terms of signal to noise ratio (SNR), error vector magnitude (EVM) or bit error rate (BER) regardless of the output spectrum shape.

In some implementations where the optical pre-emphasis is implemented by using a programmable optical filter having a center optical frequency of $f_{OP}$, such pre-emphasis scheme works only when $f_{OP}$ and $f_C$ are close enough and stable, and may not work for some low-power transceivers where the lasers are not tunable and stabilized.

The disclosed technology can be implemented in some embodiments to overcome such limitations by using a joint digital and analog (mixed signal) pre-emphasis scheme. In some embodiments of the disclosed technology, an optical transmitter may include an analog pre-emphasis between the DAC and the E/O conversion module to replace the optical pre-emphasis module illustrated in FIG. 3.

Figure 4:
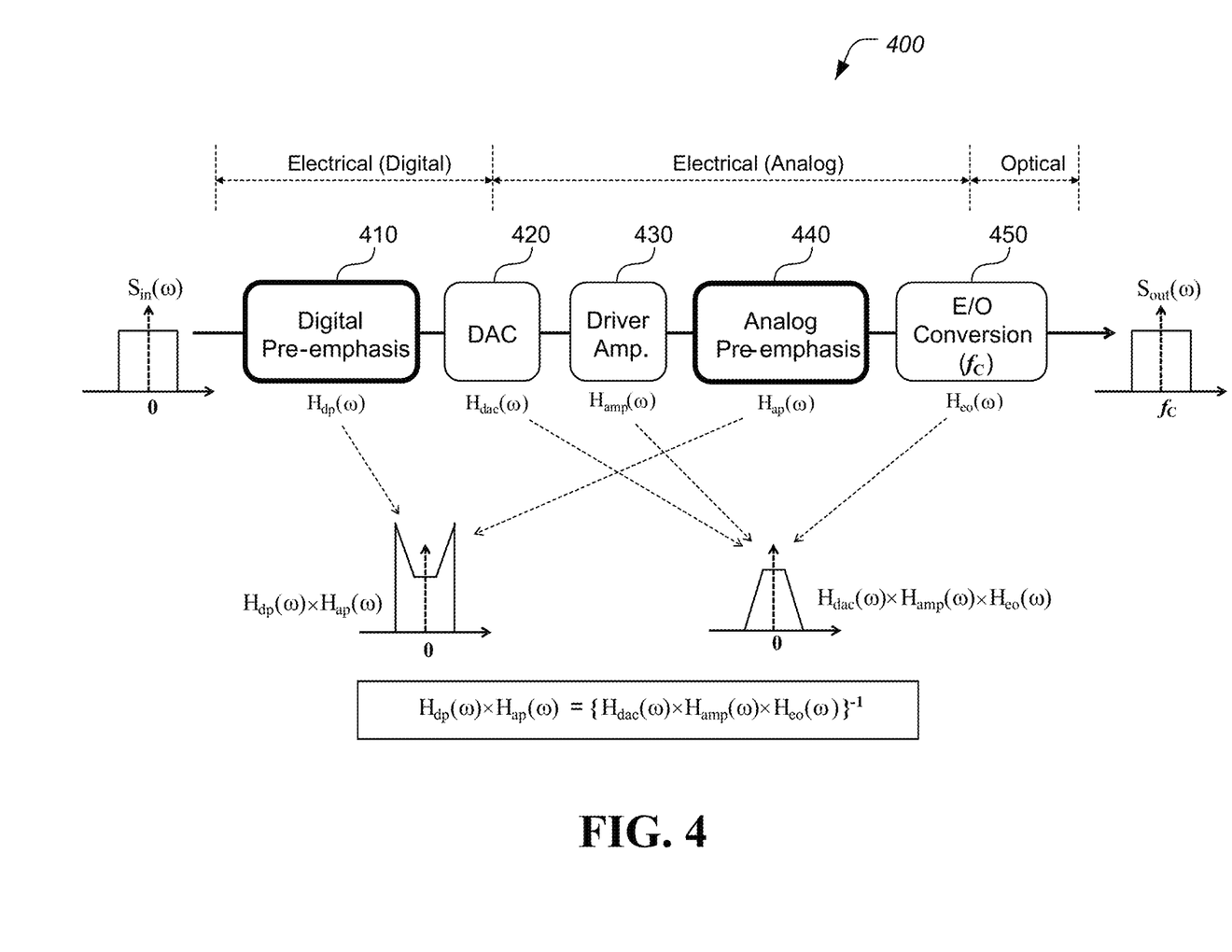
FIG. 4 illustrates another example optical signal transmitter implemented based on some embodiments of the disclosed technology.

FIG. 4 illustrates another example optical signal transmitter implemented based on some embodiments of the disclosed technology. In some implementations, an optical signal transmitter 400 includes a digital pre-emphasis module 410, a DAC 420, a driver amplifier 430, an analog pre-emphasis module 440, and an E/O conversion module 450.

In some embodiments of the disclosed technology, the analog pre-emphasis can be implemented by either active or passive electrical filter or equalizer. Since the analog pre-emphasis is not related to the carrier frequency of E/O conversion, the optical signal transmitter based on some embodiments of the disclosed technology can work for any transceivers with free-running or non-tunable lasers while improving the stability of the carrier frequency.

In some embodiments of the disclosed technology, the optical signal transmitter can employ an iterative mixed signal pre-emphasis procedure that includes the following steps.

(1) Estimate an original transmitter RF response of $H_{dac}(\omega) \times H_{amp}(\omega) \times H_{eo}(\omega)$ without any pre-emphasis, received signal to noise ratio (SNR), error vector magnitude (EVM) or bit error rate (BER), record the received SNR, EVM or BER, and feedback a first inverse RF response $H_{invCh1}(\omega)$ to a loop controller.

(2) Let $H_{invCh1}(\omega) = \alpha |H_{dp}(\omega)| \exp(j\Phi_{dp}) \times \beta |H_{ap}(\omega)| \exp(j\Phi_{ap})$ and adjust a gain factor $\mu_1 = f(abs(ifft[S_{in}(\omega) H_{dp}(\omega) H_{dac}(\omega) H_{ap}(\omega)]))$ so that the power of driving signal to the E/O conversion remain at a similar level. Here, $H_{invCh1}(\omega)$ indicates a first inverse RF response, $H_{ap}(\omega)$ indicates a transfer function of the analog pre-emphasis module 440, $H_{dp}(\omega)$ indicates a transfer function of the digital pre-emphasis module 410, $H_{dac}(\omega)$ indicates a transfer function of the DAC 420, $H_{amp}(\omega)$ indicates a transfer function of the driver amplifier 430, $H_{eo}(\omega)$ indicates a transfer function of the E/O conversion module 450, and $S_{in}(\omega)$ indicates an input signal, where $\omega$ indicates angular frequency. In addition, $\alpha$ and $\beta$ are parameters to distribute the transmitter RF response values between the digital pre-emphasis component and the analog pre-emphasis component, and $\Phi_{dp}$ and $\Phi_{ap}$ indicate phase responses at the digital pre-emphasis component and the analog pre-emphasis component, respectively.

(3) Record the first inverse RF response $H_{invCh1}(\omega)$.

(4) Re-estimate the transmitter RF response based on the $H_{invCh1}(\omega)$ mixed-signal pre-emphasis and gain factor $\mu_1$, and check if the received SNR, EVM or BER has reached the target value, and if not, feedback a second inverse RF response $H_{invCh2}(\omega)$ to the loop controller.

(5) Let $H_{invCh2}(\omega) \times H_{invCh1}(\omega) = \alpha |H_{dp}(\omega)| \exp(j\Phi_{dp}) \times \beta |H_{ap}(\omega)| \exp(j\Phi_{ap})$ and adjust the gain factor $\mu_2 = f(abs(ifft[S_{in}(\omega) H_{dp}(\omega) H_{dac}(\omega) H_{ap}(\omega)]))$ so that the power of driving signal to the E/O conversion remain at a similar level.

(6) Record $H_{invCh2}(\omega) \times H_{invCh1}(\omega)$.

(7) Re-estimate the transmitter RF response with the $H_{invCh2}(\omega) \times H_{invCh1}(\omega)$ mixed-signal pre-emphasis and gain factor $\mu_2$, and check if the received SNR, EVM or BER reach the target, and if not, feedback the third inverse RF response $H_{invCh3}(\omega)$ to the loop controller.

(8) Repeat (5)-(6) with updated inverse channel responses until the preset criteria are met.

The loop controller 510 may perform the following algorithms based on some embodiments of the disclosed technology.

In an implementation, the loop controller can assign inverse channel response alternatively between the analog and digital pre-emphasis as follows: (1) assign the analog pre-emphasis to obtain $H_{invCh1}(\omega) = \beta |H_{ap}(\omega)| \exp(j\Phi_{ap})$; (2) assign the digital pre-emphasis to obtain $H_{invCh2}(\omega) = \alpha |H_{dp}(\omega)| \exp(j\Phi_{dp})$; (3) assign the analog pre-emphasis to obtain $H_{invCh3}(\omega) \times H_{invCh1}(\omega) = \beta |H_{ap}(\omega)| \exp(j\Phi_{ap})$; and (4) assign the digital pre-emphasis to obtain $H_{invCh4}(\omega) \times H_{invCh2}(\omega) = \alpha |H_{dp}(\omega)| \exp(j\Phi_{dp})$. These analog and digital pre-emphasis procedures can be further performed in the same manner.

In another implementation, the loop controller can also let analog pre-emphasis handle only the initial inverse channel response, and assign all the subsequent iterative workload to the digital pre-emphasis as follows: (1) assign the analog pre-emphasis to obtain $H_{invCh1}(\omega) = \beta |H_{ap}(\omega)| \exp(j\Phi_{ap})$; (2) assign the digital pre-emphasis to obtain $H_{invCh2}(\omega) = \alpha |H_{dp}(\omega)| \exp(j\Phi_{dp})$; (3) assign the digital pre-emphasis to obtain $H_{invCh3}(\omega) \times H_{invCh2}(\omega) = \alpha |H_{dp}(\omega)| \exp(j\Phi_{dp})$; and (4) assign the digital pre-emphasis to obtain $H_{invCh4}(\omega) \times H_{invCh3}(\omega) \times H_{invCh2}(\omega) = \alpha |H_{dp}(\omega)| \exp(j\Phi_{dp})$. These digital pre-emphasis procedures can be further performed in the same manner.

Figure 5:
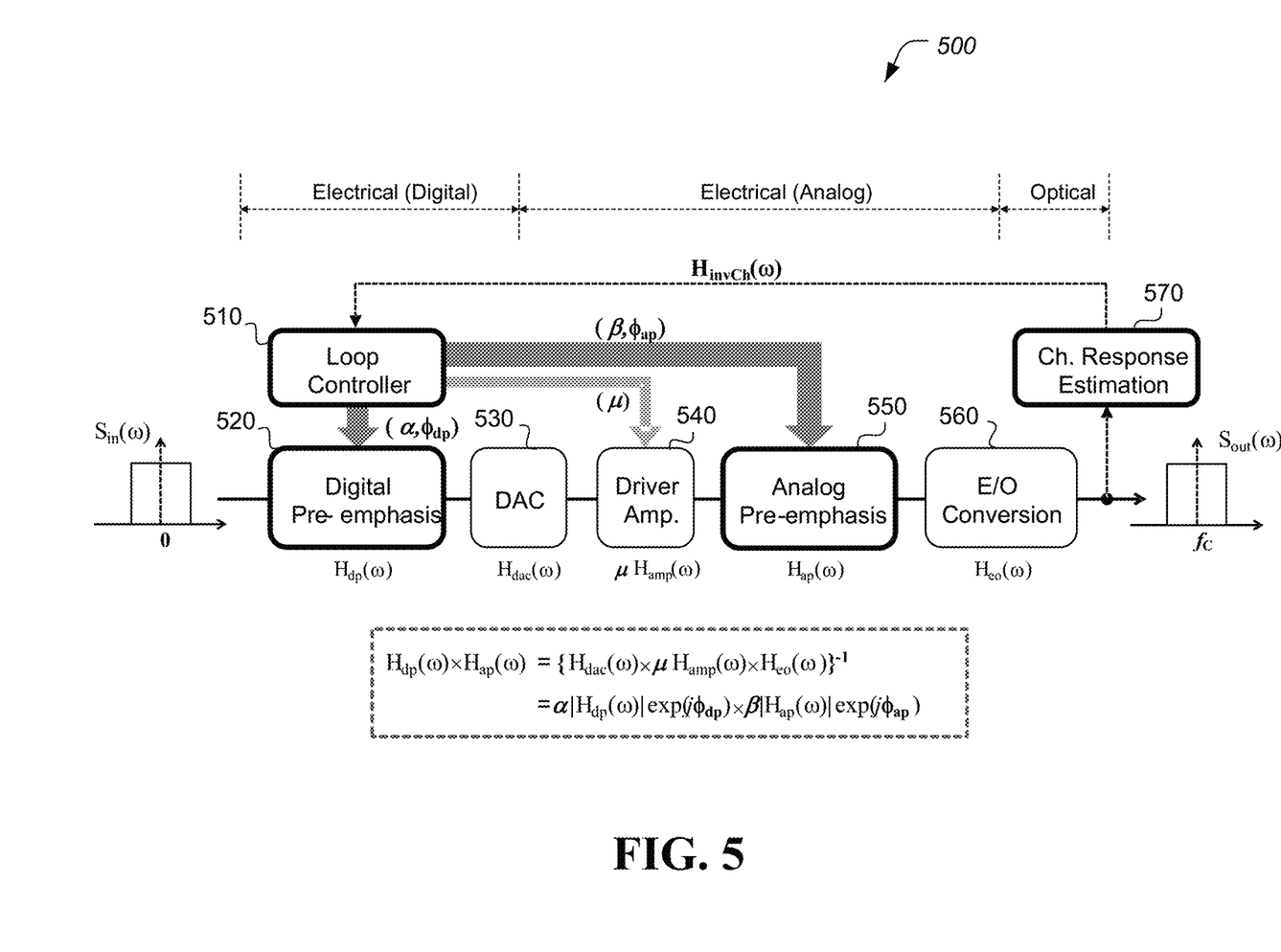
FIG. 5 illustrates another example optical signal transmitter implemented based on some embodiments of the disclosed technology.

FIG. 5 illustrates another example optical signal transmitter implemented based on some embodiments of the disclosed technology. In some implementations, an optical signal transmitter 500 includes a loop controller 510, a digital pre-emphasis module 520, a DAC 530, a driver amplifier 540, an analog pre-emphasis module 550, an E/O conversion module 560, and a channel response estimation module 570. As shown in FIG. 5, the analog pre-emphasis module 550 may be placed after the driver amplifier 540.

In some embodiments of the disclosed technology, the optical signal transmitter can optimize the output signal $S_{out}(\omega)$ by finding $H_{dp}(\omega) \times H_{ap}(\omega)$ that equals to the inverse channel response $\{H_{dac}(\omega) \times \mu H_{amp}(\omega) \times H_{eo}(\omega)\}^{-1}$, which equals to $\alpha |H_{dp}(\omega)| \exp(j\Phi_{dp}) \times \beta |H_{ap}(\omega)| \exp(j\Phi_{ap})$, where $H_{dp}(\omega)$ indicates a transfer function of the digital pre-emphasis module 520, $H_{ap}(\omega)$ indicates a transfer function of the analog pre-emphasis module 520, $H_{dac}(\omega)$ indicates a transfer function of the DAC 530, $H_{amp}(\omega)$ indicates a transfer function of the driver amplifier 540, and $H_{eo}(\omega)$ indicates a transfer function of the E/O conversion module 560. Here, the gain factor $\mu = f(abs(ifft[S_{in}(\omega) H_{dp}(\omega) H_{dac}(\omega) H_{ap}(\omega)]))$.

Figure 6:
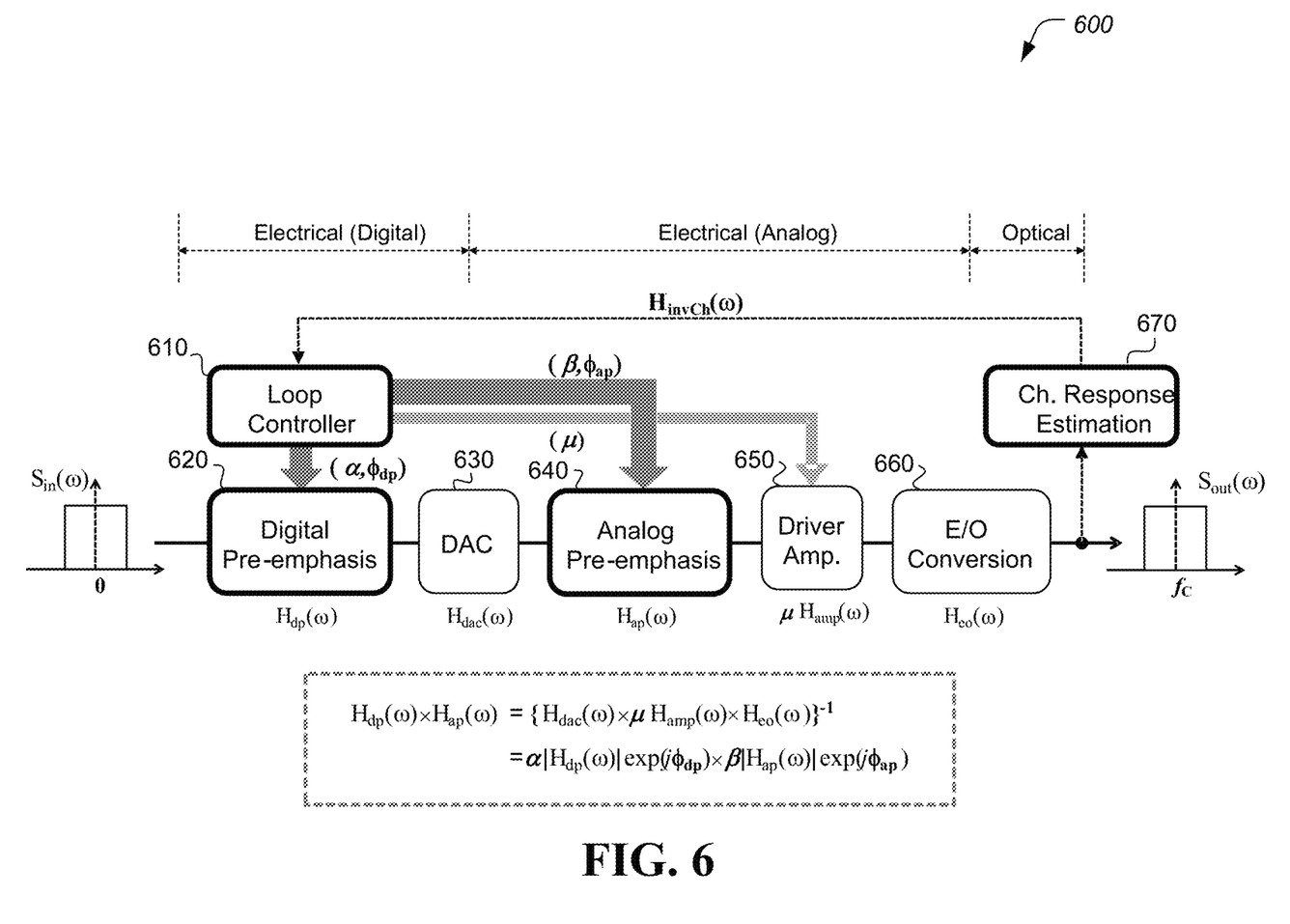
FIG. 6 illustrates another example optical signal transmitter implemented based on some embodiments of the disclosed technology.

FIG. 6 illustrates another example optical signal transmitter implemented based on some embodiments of the disclosed technology. In some implementations, an optical signal transmitter 600 includes a loop controller 610, a digital pre-emphasis module 620, a DAC 630, an analog pre-emphasis module 640, a driver amplifier 650, an E/O conversion module 660, and a channel response estimation module 670. As shown in FIG. 6, the analog pre-emphasis module 640 may be placed before the driver amplifier 650.

In some embodiments of the disclosed technology, the optical signal transmitter can optimize the output signal $S_{out}(\omega)$ by finding $H_{dp}(\omega) \times H_{ap}(\omega)$ that equals to the inverse channel response $\{H_{dac}(\omega) \times \mu H_{amp}(\omega) \times H_{eo}(\omega)\}^{-1}$, which equals to $\alpha |H_{dp}(\omega)| \exp(j\Phi_{dp}) \times \beta |H_{ap}(\omega)| \exp(j\Phi_{ap})$, where $H_{dp}(\omega)$ indicates a transfer function of the digital pre-emphasis module 620, $H_{ap}(\omega)$ indicates a transfer function of the analog pre-emphasis module 640, $H_{dac}(\omega)$ indicates a transfer function of the DAC 630, $H_{amp}(\omega)$ indicates a transfer function of the driver amplifier 650, and $H_{eo}(\omega)$ indicates a transfer function of the E/O conversion module 660. Here, the gain factor $\mu = f(abs(ifft[S_{in}(\omega) H_{dp}(\omega) H_{dac}(\omega) H_{ap}(\omega)]))$.

Figure 7:
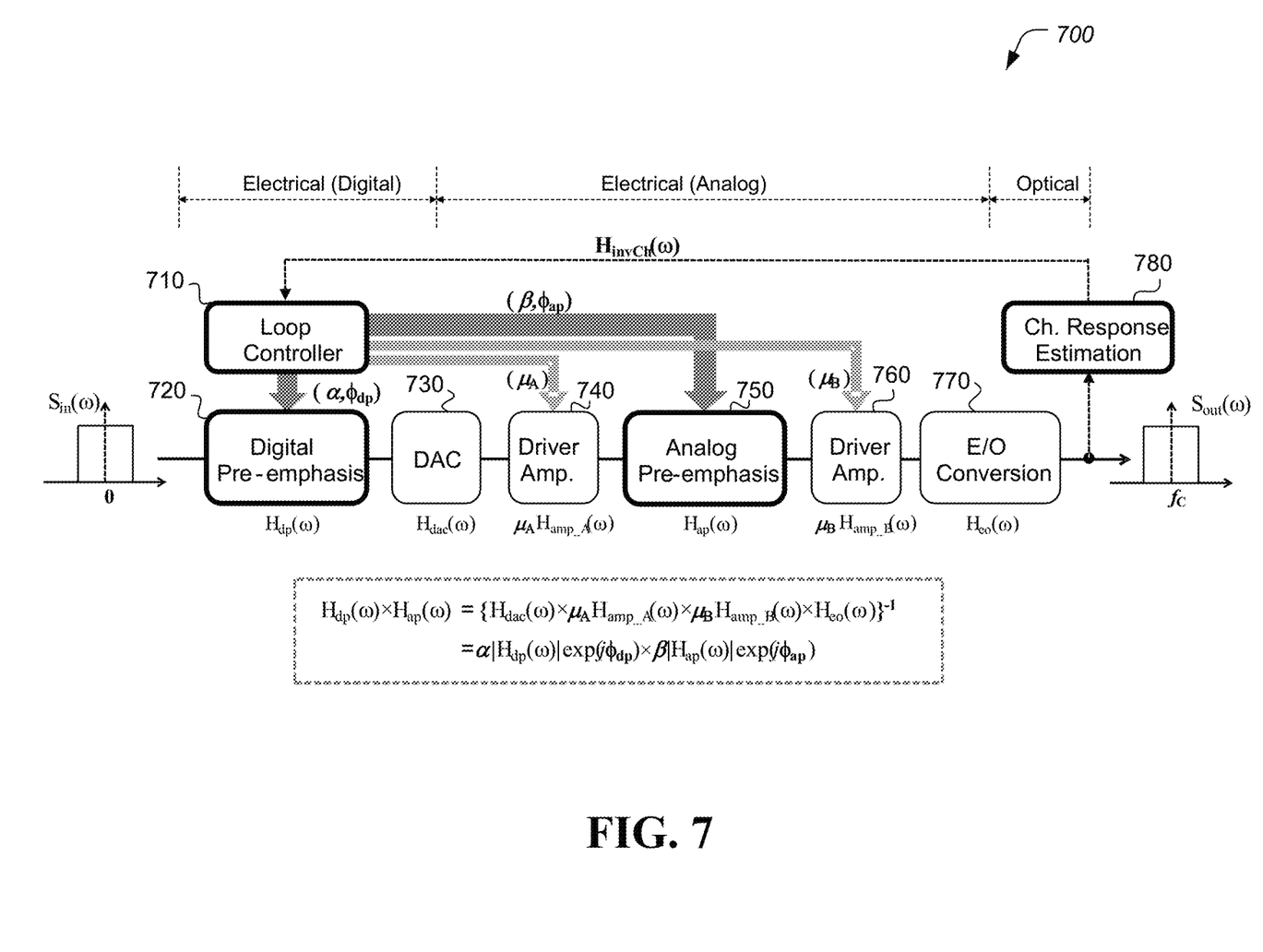
FIG. 7 illustrates another example optical signal transmitter implemented based on some embodiments of the disclosed technology.

FIG. 7 illustrates another example optical signal transmitter implemented based on some embodiments of the disclosed technology. In some implementations, an optical signal transmitter 700 includes a loop controller 710, a digital pre-emphasis module 720, a DAC 730, a first driver amplifier 740, an analog pre-emphasis module 750, a second driver amplifier 760, an E/O conversion module 770, and a channel response estimation module 780.

In some embodiments of the disclosed technology, the optical signal transmitter can optimize the output signal $S_{out}(\omega)$ by finding $H_{dp}(\omega) \times H_{ap}(\omega)$ that equals to the inverse channel response $\{H_{dac}(\omega) \times \mu_A H_{amp\_A}(\omega) \times \mu_B H_{amp\_B}(\omega) \times H_{eo}(\omega)\}^{-1}$, which equals to $\alpha |H_{dp}(\omega)| \exp(j\Phi_{dp}) \times \beta |H_{ap}(\omega)| \exp(j\Phi_{ap})$, where $H_{dp}(\omega)$ indicates a transfer function of the digital pre-emphasis module 720, $H_{ap}(\omega)$ indicates a transfer function of the analog pre-emphasis module 750, $H_{dac}(\omega)$ indicates a transfer function of the DAC 730, $H_{amp\_A}(\omega)$ indicates a transfer function of the first driver amplifier 740, $H_{amp\_B}(\omega)$ indicates a transfer function of the second driver amplifier 760, and $H_{eo}(\omega)$ indicates a transfer function of the E/O conversion module 770. Here, the gain factor $\mu_A = f(\text{abs}(\text{ifft}[S_{in}(\omega)H_{dp}(\omega)H_{dac}(\omega)]))$ and $\mu_B = f(\text{abs}(\text{ifft}[\mu_A S_{in}(\omega)H_{dp}(\omega)H_{dac}(\omega)H_{amp\_A}(\omega)H_{ap}(\omega)]))$ are adjusted so that the input power to the analog pre-emphasis module and the E/O conversion can both remain constant without being affected by the pre-emphasis.

In some embodiments of the disclosed technology, an optical signal transmitter system in an optical communication network includes a digital pre-emphasis device structured to generate a pre-emphasized digital data signal by pre-emphasizing at least a portion of a data bit signal to be transmitted. The digital pre-emphasis device may be implemented using a numerical computer or a processor or another electronic circuitry that performs arithmetic operations such as multiplications (or bit-shifts) and additions/subtractions. The system includes a digital-to-analog converter (DAC) coupled to the digital pre-emphasis device to convert the pre-emphasized digital data signal into an analog data signal. The DAC may be implemented using electronic circuitry. The system includes an analog pre-emphasis device coupled to the digital-to-analog converter to generate a pre-emphasized analog data signal by pre-emphasizing at least a portion of the analog data signal. The analog pre-emphasis device may be implemented using an analog variable gain frequency selective component arrangement that includes tunable capacitors and/or inductors that may be implemented using discrete components of solid-state electronics. The system includes an electrical-to-optical converter to generate a channel response by converting the pre-emphasized analog signal into an optical signal. The electrical to optical conversion may use a diode or another type of electronic component to produce optical signals based on input electrical signals. The analog pre-emphasis device and the digital pre-emphasis device are configured based on a transfer function of the digital pre-emphasis device, a transfer function of the analog pre-emphasis device, and an inverse channel response of the optical signal transmitter.

In some implementations, the analog pre-emphasis device and the digital pre-emphasis device are configured such that a product of a transfer function of the digital pre-emphasis device and a transfer function of the analog pre-emphasis device equals to an inverse channel response of the optical signal transmitter.

In some embodiments of the disclosed technology, the optical signal transmitter system in an optical communication network further includes a driver amplifier coupled to an output terminal of the digital-to-analog converter to amplify the analog data signal to be fed to the analog pre-emphasis device. In some implementations, the inverse channel response of the optical signal transmitter is determined based on frequency responses of the digital to analog converter component, the driver amplifier component, and the electrical-to-optical conversion component.

In some embodiments of the disclosed technology, the optical signal transmitter system in an optical communication network further includes a driver amplifier coupled to an output terminal of the analog pre-emphasis device to amplify the pre-emphasized analog data signal to be fed to the electrical-to-optical converter. The inverse channel response of the optical signal transmitter is determined based on frequency responses of the digital to analog converter, the driver amplifier, and the electrical-to-optical converter.

Figure 8:
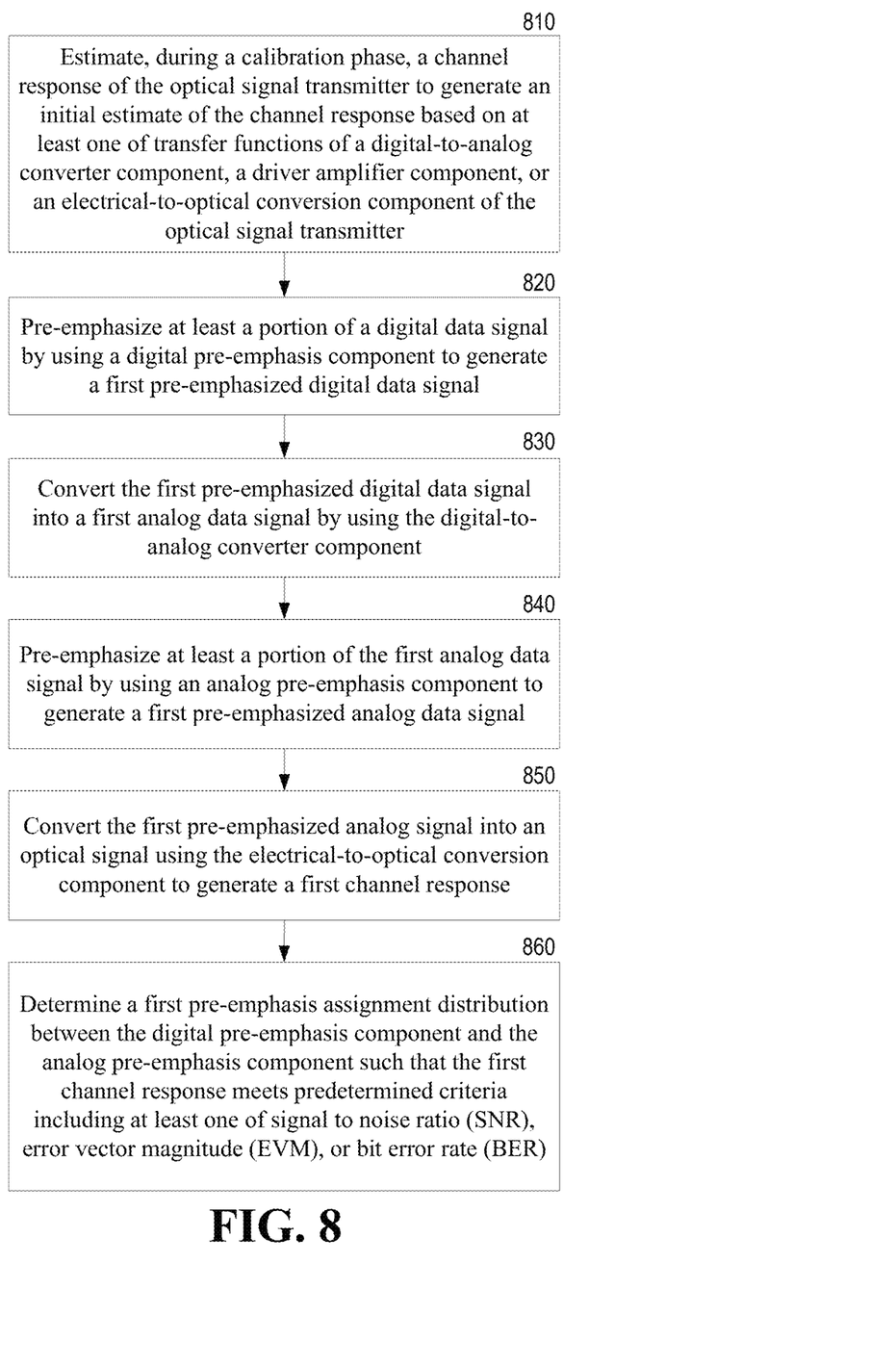
FIG. 8 illustrates an example optical communication method.

FIG. 8 is a flow chart representation of an example optical communication method including various steps 810, 820, 830, 840, 850, and 860. The method includes, at the step 810, estimating, during a calibration phase, a channel response of the optical signal transmitter based on at least one of a transfer functions of a digital-to-analog converter component, a driver amplifier component, or an electrical-to-optical conversion component of the optical signal transmitter. For example, calibration phase may be used prior to initial deployment of the transmitter device. Similarly, periodically, the transmitter device may be serviced by re-calibrating to optimize operational parameters, which is also called the calibration phase herein. The periodic re-calibration may be performed after passage of a fixed amount of time (e.g., one year) or upon noticing a change in the operational efficiency of the transmitter device.

The method includes, at the step 820, pre-emphasizing at least a portion of each data bit signal by using a digital pre-emphasis component to generate a first pre-emphasized digital data signal. The method includes, at the step 830, converting the first pre-emphasized digital data signal into a first analog data signal by using the digital-to-analog converter component. The method includes, at the step 840, pre-emphasizing at least a portion of the first analog data signal by using an analog pre-emphasis component to generate a first pre-emphasized analog data signal. The method includes, at the step 850, converting the first pre-emphasized analog signal into an optical signal using the electrical-to-optical conversion component to generate a first channel response. The method also includes, at the step 860, determining a first pre-emphasis assignment distribution between the digital pre-emphasis component and the analog pre-emphasis component such that the first channel response meets predetermined criteria including at least one of signal to noise ratio (SNR), error vector magnitude (EVM), or bit error rate (BER).

The first pre-emphasis assignment distribution obtained during the calibration phase is used to transmit an optical signal. For example, optical signal to be transmitted can be processed based on the first pre-emphasis assignment distribution between the digital pre-emphasis component and the analog pre-emphasis component determined during the calibration phase.

In some embodiments of the disclosed technology, the method further includes amplifying the first analog data signal to be fed to the analog pre-emphasis.

In some embodiments of the disclosed technology, the method further includes amplifying the first pre-emphasized analog data signal to be fed to the electrical-to-optical conversion component.

In some embodiments of the disclosed technology, the method further includes a first amplification process for amplifying the first analog data signal to be fed to the analog pre-emphasis and a second amplification process for amplifying the first pre-emphasized analog data signal to be fed to the electrical-to-optical conversion component. In some implementations, a gain factor of amplification is distributed between the first and second amplification processes.

In some embodiments of the disclosed technology, the method further includes re-estimating, upon determination that the first channel response has failed to meet the predetermined criteria, a channel response of the optical signal transmitter based on the first channel response such that the estimated channel response of the optical signal transmitter is determined based on at least one of the first pre-emphasized digital data signal or the first pre-emphasized analog data signal, pre-emphasizing at least a portion of the estimated channel response by using the digital pre-emphasis component to generate a second pre-emphasized digital data signal, convert the second pre-emphasized digital data signal into a second analog data signal by using the digital to analog converter component, pre-emphasizing at least a portion of the second analog data signal by using the analog pre-emphasis component to generate a second pre-emphasized analog data signal, convert the second pre-emphasized analog signal into an optical signal using the electrical-to-optical conversion component to generate a second channel response, and transmit, upon determination that the second channel response meets the predetermined criteria, the second channel response.

In some implementations, the re-estimating of the channel response of the optical signal transmitter is performed by alternatively using the analog pre-emphasis and digital pre-emphasis components to determine an inverse channel response.

In some embodiments of the disclosed technology, the method further includes re-estimating, upon determination that the first channel response has failed to meet the predetermined criteria, a channel response of the optical signal transmitter based on the first channel response such that the estimated channel response of the optical signal transmitter is determined based on the first pre-emphasized analog data signal, pre-emphasizing at least a portion of the estimated channel response by using the digital pre-emphasis component to generate a second pre-emphasized digital data signal, convert the second pre-emphasized digital data signal into a second analog data signal by using the digital to analog converter component, pre-emphasizing at least a portion of the second analog data signal by using the analog pre-emphasis component to generate a second pre-emphasized analog data signal, convert the second pre-emphasized analog signal into an optical signal using the electrical-to-optical conversion component to generate a second channel response, and transmit, upon determination that the second channel response meets the predetermined criteria, the second channel response.

In some implementations, the re-estimating of the channel response of the optical signal transmitter is performed by alternatively using the analog pre-emphasis and digital pre-emphasis components to determine an inverse channel response.

In some embodiments of the disclosed technology, the method further includes re-estimating, upon determination that the first channel response has failed to meet the predetermined criteria, a channel response of the optical signal transmitter based on the first channel response such that the estimated channel response of the optical signal transmitter is determined based on the first pre-emphasized analog data signal, pre-emphasizing at least a portion of the estimated channel response by using the digital pre-emphasis component to generate a second pre-emphasized digital data signal, convert the second pre-emphasized digital data signal into a second analog data signal by using the digital to analog converter component, pre-emphasizing at least a portion of the second analog data signal by using the analog pre-emphasis component to generate a second pre-emphasized analog data signal, convert the second pre-emphasized analog signal into an optical signal using the electrical-to-optical conversion component to generate a second channel response, and transmitting, upon determination that the second channel response meets the predetermined criteria, the second channel response.

In some implementations, at an initial re-estimating process, the re-estimating of the channel response of the optical signal transmitter is performed by using the analog pre-emphasis component, and at subsequent re-estimating processes, the re-estimating of the channel response of the optical signal transmitter is performed by using the digital pre-emphasis component.

In some embodiments, after the calibration phase, the transmitting device may be then operated in an operational phase during which the parameters for pre-emphasis obtained during the calibration phase are used for subsequent operation of the transmitting device.

The disclosed and other embodiments, algorithms, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "signal processing circuit" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

In implementing the equalization algorithm discussed in this document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An optical signal transmitter system in an optical communication network, comprising:
   a digital pre-emphasis device structured to generate a pre-emphasized digital data signal by pre-emphasizing at least a portion of a digital data signal to be transmitted;
   a digital-to-analog converter coupled to the digital pre-emphasis device to convert the pre-emphasized digital data signal into an analog data signal;
   an analog pre-emphasis device coupled to the digital-to-analog converter to generate a pre-emphasized analog data signal by pre-emphasizing at least a portion of the analog data signal;
   an electrical-to-optical converter to convert the pre-emphasized analog signal into an optical signal; and
   a processor configured to determine a pre-emphasis assignment distribution between the digital pre-emphasis device and the analog pre-emphasis device based on transfer functions of the digital pre-emphasis device, the analog pre-emphasis device, the digital-to-analog converter and electrical-to-optical converter, and an estimate of an inverse radio frequency response of the optical signal transmitter system obtained at an output terminal of the electrical-to-optical converter.

2. The system of claim 1, wherein the pre-emphasis assignment distribution between the digital pre-emphasis device and the analog pre-emphasis device is determined such that a product of the transfer function of the digital pre-emphasis device and the transfer function of the analog pre-emphasis device equals to the inverse radio frequency response of the optical signal transmitter system.

3. The system of claim 1, wherein the processor includes a loop controller coupled to the digital pre-emphasis device, the analog pre-emphasis device, and the output terminal of the electrical-to-optical converter to assign the estimate of the inverse radio frequency response between the digital pre-emphasis device and the analog pre-emphasis device.

4. The system of claim 1, further comprising a driver amplifier coupled to an output terminal of the digital-to-analog converter to amplify the analog data signal to be fed to the analog pre-emphasis device.

5. The system of claim 4, wherein the inverse radio frequency response of the optical signal transmitter is determined based on frequency responses of the digital to analog converter device, the driver amplifier, and the electrical-to-optical converter.

6. The system of claim 1, further comprising a driver amplifier coupled to an output terminal of the analog pre-emphasis device to amplify the pre-emphasized analog data signal to be fed to the electrical-to-optical converter.

7. The system of claim 6, wherein the inverse radio frequency response of the optical signal transmitter system is determined based on frequency responses of the digital to analog converter, the driver amplifier, and the electrical-to-optical converter.

8. The system of claim 1, wherein the analog pre-emphasis device includes at least one of an active electrical filter or a passive electrical filter.

9. A method of optical communication, implementable at an optical signal transmitter in an optical communication network, comprising:
   estimating, during a calibration phase, a channel response of the optical signal transmitter to generate an initial estimate of the channel response based on at least one of transfer functions of a digital-to-analog converter component, a driver amplifier component, or an electrical-to-optical conversion component of the optical signal transmitter;
   pre-emphasizing at least a portion of a digital data signal by using a digital pre-emphasis component to generate a first pre-emphasized digital data signal;
   converting the first pre-emphasized digital data signal into a first analog data signal by using the digital-to-analog converter component;
   pre-emphasizing at least a portion of the first analog data signal by using an analog pre-emphasis component to generate a first pre-emphasized analog data signal;
   converting the first pre-emphasized analog signal into an optical signal using the electrical-to-optical conversion component to generate a first channel response; and
   determining a first pre-emphasis assignment distribution between the digital pre-emphasis component and the analog pre-emphasis component such that the first channel response meets predetermined criteria including at least one of signal to noise ratio (SNR), error vector magnitude (EVM), or bit error rate (BER).

10. The method of claim 9, further comprising transmitting an optical signal processed based on the first pre-emphasis assignment distribution between the digital pre-emphasis component and the analog pre-emphasis component determined during the calibration phase.

11. The method of claim 9, further comprising amplifying the first analog data signal to be fed to the analog pre-emphasis.

12. The method of claim 9, further comprising amplifying the first pre-emphasized analog data signal to be fed to the electrical-to-optical conversion component.

13. The method of claim 9, further comprising a first amplification process for amplifying the first analog data signal to be fed to the analog pre-emphasis and a second amplification process for amplifying the first pre-emphasized analog data signal to be fed to the electrical-to-optical conversion component.

14. The method of claim 13, wherein a gain factor of amplification is distributed between the first and second amplification processes.

15. The method of claim 13, wherein, at an initial re-estimating process, the re-estimating of the channel response of the optical signal transmitter is performed by using the analog pre-emphasis component.

16. The method of claim 15, wherein, at subsequent re-estimating processes, the re-estimating of the channel response of the optical signal transmitter is performed by using the digital pre-emphasis component.

17. The method of claim 9, further comprising:
re-estimating, upon determination that the first channel response has failed to meet the predetermined criteria, a channel response of the optical signal transmitter based on the first channel response such that the estimated channel response of the optical signal transmitter is determined based on at least one of the first pre-emphasized digital data signal or the first pre-emphasized analog data signal;
pre-emphasizing at least a portion of the estimated channel response by using the digital pre-emphasis component to generate a second pre-emphasized digital data signal;
converting the second pre-emphasized digital data signal into a second analog data signal by using the digital to analog converter component;
pre-emphasizing at least a portion of the second analog data signal by using the analog pre-emphasis component to generate a second pre-emphasized analog data signal;
converting the second pre-emphasized analog signal into an optical signal using the electrical-to-optical conversion component to generate a second channel response; and
determining a second pre-emphasis assignment distribution between the digital pre-emphasis component and the analog pre-emphasis component such that the second channel response meets the predetermined criteria including at least one of SNR, EVM, or BER.

18. The method of claim 17, wherein the re-estimating of the channel response of the optical signal transmitter is performed by alternatively using the analog pre-emphasis and digital pre-emphasis components to determine an inverse channel response.

19. The method of claim 17, further comprising transmitting an optical signal processed based on the second pre-emphasis assignment distribution between the digital pre-emphasis component and the analog pre-emphasis component determined during the calibration phase.

20. The method of claim 9, further comprising:
re-estimating, upon determination that the first channel response has failed to meet the predetermined criteria, a channel response of the optical signal transmitter based on the first channel response such that the estimated channel response of the optical signal transmitter is determined based on the first pre-emphasized analog data signal;
pre-emphasizing at least a portion of the estimated channel response by using the digital pre-emphasis component to generate a second pre-emphasized digital data signal;
converting the second pre-emphasized digital data signal into a second analog data signal by using the digital to analog converter component;
pre-emphasizing at least a portion of the second analog data signal by using the analog pre-emphasis component to generate a second pre-emphasized analog data signal;
converting the second pre-emphasized analog signal into an optical signal using the electrical-to-optical conversion component to generate a second channel response; and
determining a second pre-emphasis assignment distribution between the digital pre-emphasis component and the analog pre-emphasis component such that the second channel response meets the predetermined criteria including at least one of SNR, EVM, or BER.

21. The method of claim 20, further comprising transmitting an optical signal processed based on the second pre-emphasis assignment distribution between the digital pre-emphasis component and the analog pre-emphasis component determined during the calibration phase.

* * * * *